July 17, 1923.

C. E. BOONE

WAVE MOTOR

Filed Dec. 22, 1920

INVENTOR
Clarence E. Boone.
By Hazard Miller
ATTYS.

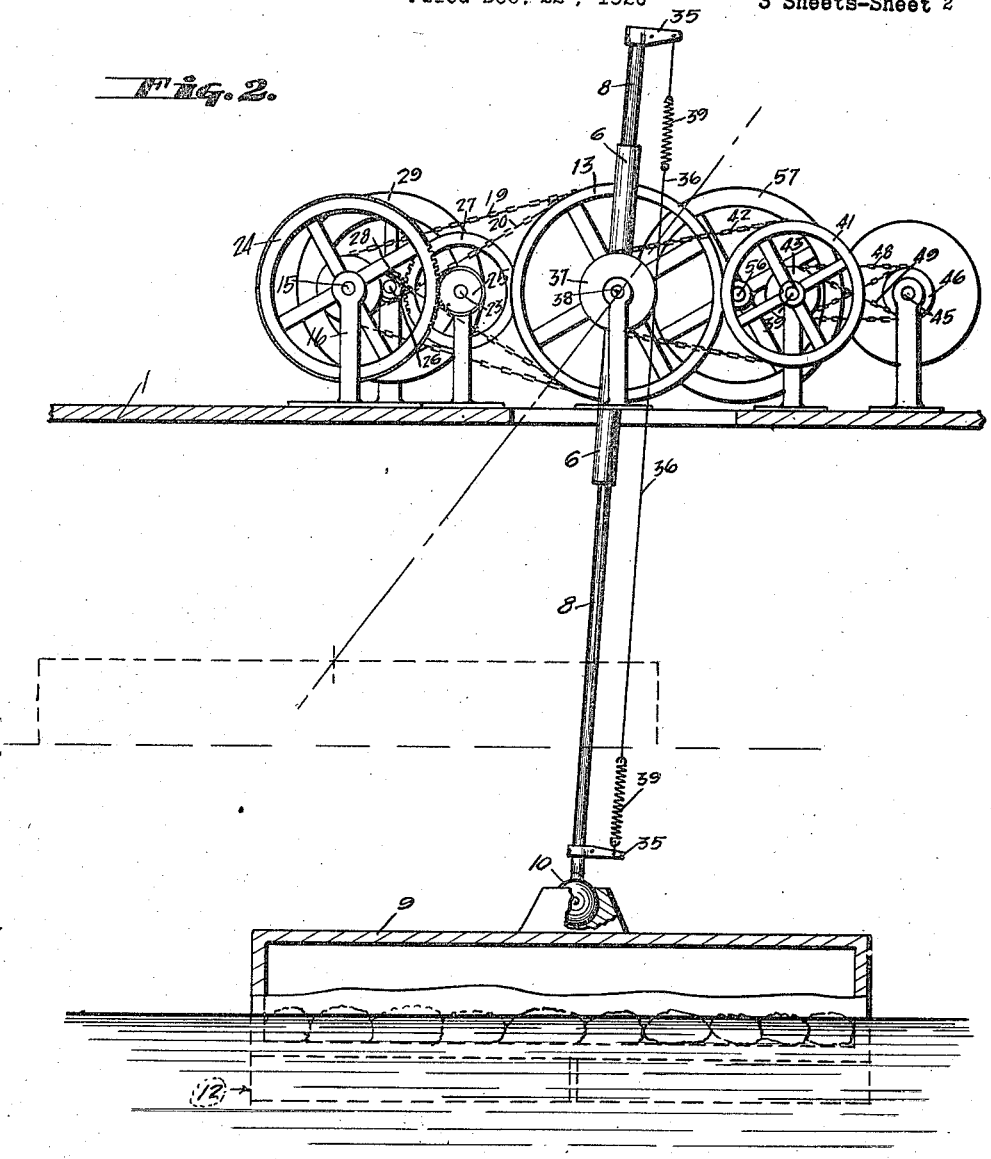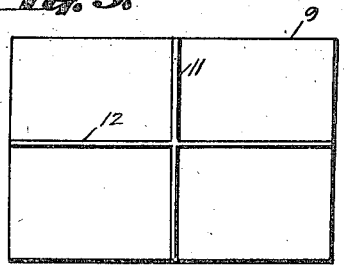

July 17, 1923.
C. E. BOONE
WAVE MOTOR
Filed Dec. 22, 1920
1,461,747
3 Sheets-Sheet 3
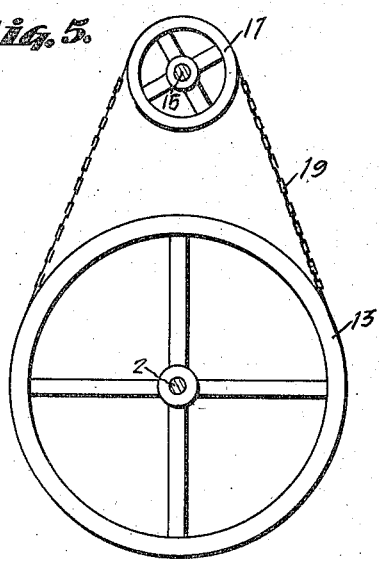
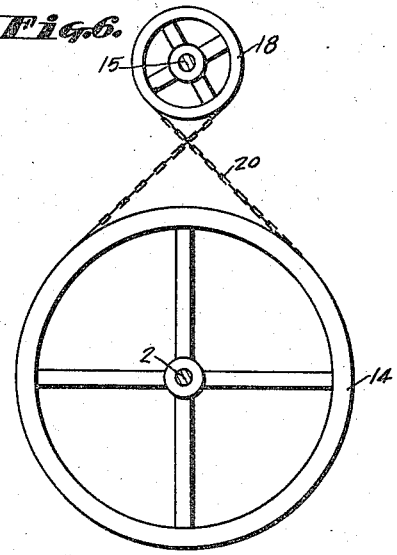
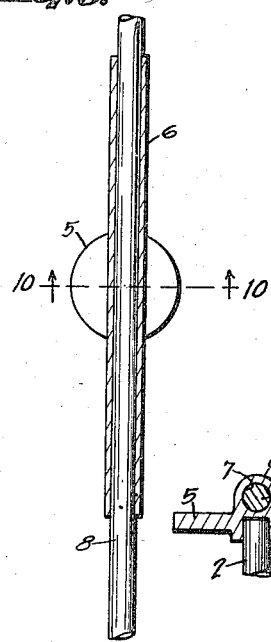
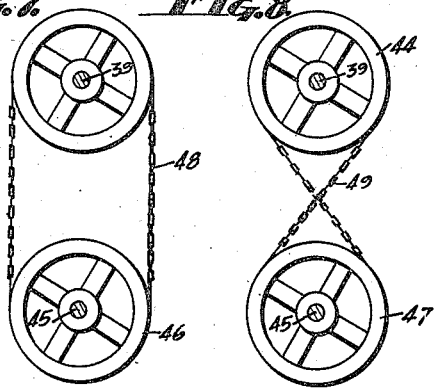
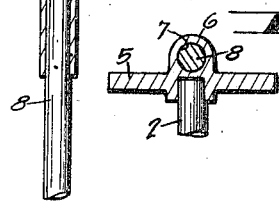
INVENTOR
Clarence E. Boone.
by Hazard & Miller
ATTYS.

Patented July 17, 1923.

1,461,747

UNITED STATES PATENT OFFICE.

CLARENCE E. BOONE, OF LONG BEACH, CALIFORNIA.

WAVE MOTOR.

Application filed December 22, 1920. Serial No. 432,561.

*To all whom it may concern:*

Be it known that I, CLARENCE E. BOONE, a citizen of the United States, residing at Long Beach, in the county of Los Angeles and State of California, have invented new and useful Improvements in Wave Motors, of which the following is a specification.

It is the object of this invention to provide a wave motor which employs both the horizontal and vertical motions of the waves for driving the movable member of the motor.

The invention will be readily understood from the following description of the accompanying drawings, in which:

Fig. 2 is a side elevation of the same partly in vertical section, and showing in dotted lines the position to which the actuating float of the motor is moved by the action of waves.

Fig. 3 is a bottom plan view of the float.

Figure 1:
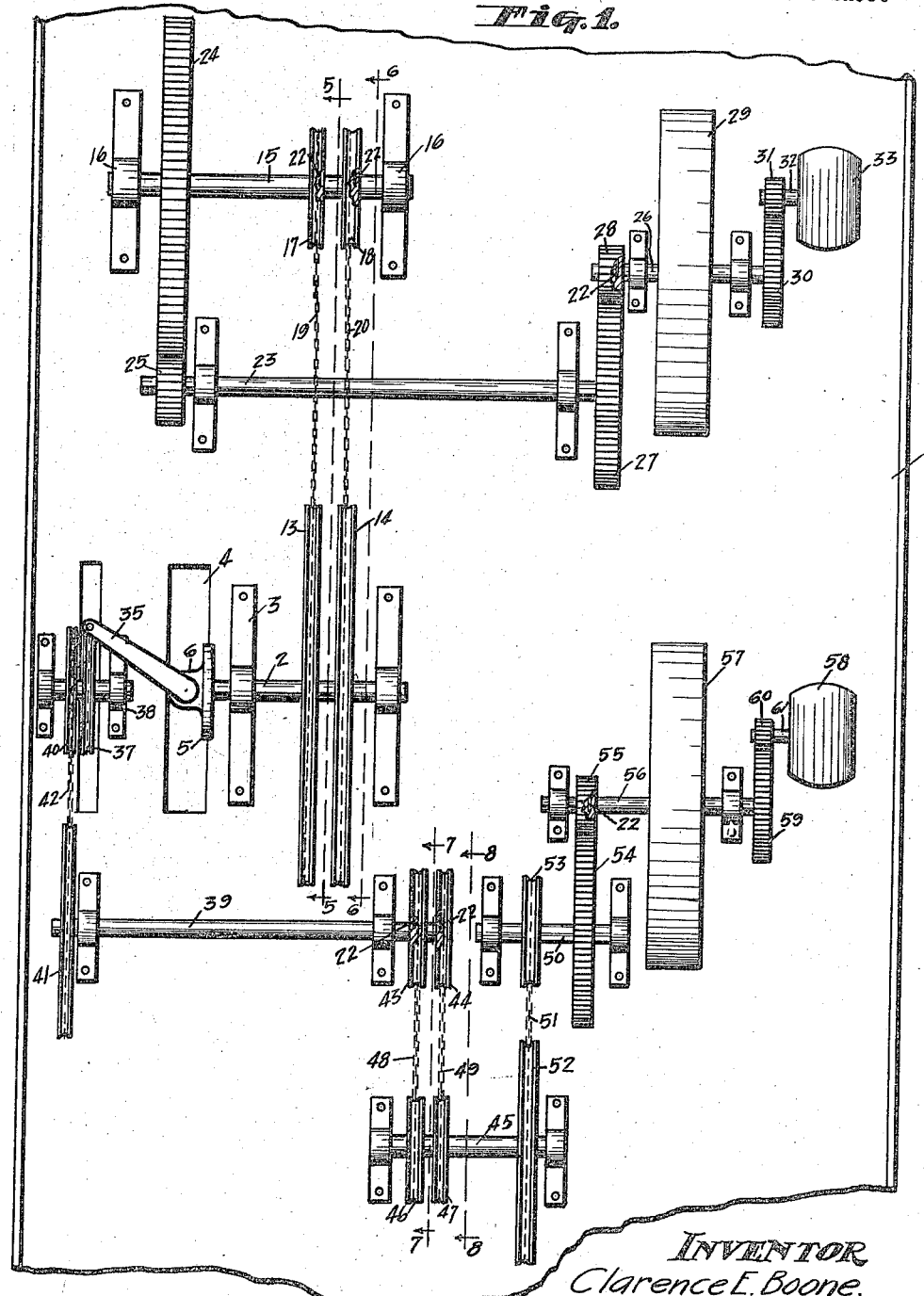
Figure 1 is a plan view of the motor.

Figs. 4 to 9, inclusive, are detail sections, Figs. 5 to 8, inclusive, being on the lines 5—5, 6—6, 7—7, and 8—8 respectively of Fig. 1.

Fig. 10 is a transverse section on the line 10—10 of Fig. 9.

The wave motor may be mounted upon a suitable base 1 supported in any suitable manner above the surface of the water. A shaft 2 is journaled in bearing brackets 3 upon base 1 with the end of said shaft above a suitable opening 4 provided in the base. A disc 5 is fixed upon the end of the shaft and carries a base 6, which is extended radially beyond opposite sides of the disc in the form of a sleeve. This sleeve is provided with an axial bore 7 forming a bearing for a slidable rod 8.

The rod 8 extends beyond the respective ends of sleeve 6, and at its lower end is connected to a float 9 by the universal joint 10. The float 9 is preferably hollow and the under surface of the same is provided with ribs 11 and 12 extending transversely and longitudinally of the float respectively. The hollow interior of the float is provided with suitable ballast so as to cause the float to rest upon the water with the lower portion thereof submerged.

By this arrangement it will be seen that the action of waves against the float will oscillate rod 8 and sleeve 6 so as to oscillate shaft 2, and the oscillations of this shaft are converted into continuous rotary movement for actuating a motor or the like by the following described mechanism mounted upon base 1.

Pulleys 13 and 14 are fixed upon shaft 2, and a shaft 15 is journaled in brackets 16 upon base 1, is provided with pulleys 17 and 18 in alinement with pulleys 13 and 14 respectively. Driving connections are provided for pulleys 13—17 and 14—18. These driving connections are chain connections shown as a straight chain 19 connecting pulleys 13 and 17, and a cross chain 20 connecting pulleys 14 and 18. It will thus be seen that the oscillations of pulleys 13—14 will oscillate pulleys 17—18 in opposite directions.

Pulleys 17—18 are mounted upon shaft 15 by pawl and ratchet connections which are oppositely arranged, so that turning of pulley 17 in one direction will provide a driving connection for rotating shaft 15, while the simultaneous turning of pulley 18 in the opposite direction will cause the latter to move freely with relation to shaft 15. During the subsequent reverse turning of pulleys 17 and 18, pulley 17 will slip freely with relation to shaft 15, while pulley 18 will provide a driving connection for continuing the rotation of shaft 15 in the same direction. The ratchet connection is shown in detail in Fig. 4 as it is applied to pulley 17, and it will be understood that the ratchet connection for pulley 18 is similarly arranged.

The ratchet 21 is fixed upon shaft 15 and pulley 17 carries pawls 22 arranged to engage the ratchet of opposite sides thereof, so that when rotating in one direction the pulley provides a driving connection for the ratchet and shaft, and when rotating in the opposite direction will turn freely with relation to the ratchet and shaft.

The continuous rotation of shaft 15 as thus provided for is transmitted to a shaft 23 by a gear and pinion connection 24—25, and from shaft 23 a driving connection for a shaft 26 is provided including a gear 27 upon shaft 23 and a pinion 28 mounted upon shaft 26 by a pawl and ratchet connection, which may be similar to that previously described for the pulley 17 and shaft 15. The shaft 26 carries a fly-wheel 29, and as a result of the pawl and ratchet mounting for pinion 28, the shaft 26 and the fly-wheel will be rotated at a constant speed by the continuous rotation of shafts 23 and 15 even though these latter shafts vary in speed due to the pause which will occur between the driving connections provided by the oppositely oscillating pulleys 17 and 18.

Power may be taken from shaft 26 for any suitable purpose, and in the present instance I have shown this shaft connected by a gear and pinion 30—31 to the shaft 32 of an electric generator 33.

The mechanism as thus described utilizes the horizontal movement of waves for generating power, and the device also employs the vertical movement of waves for generating power.

For this purpose rod 8, which is slidable through sleeve 6, is provided at its respective ends with laterally projecting arms 35 connected by a suitable flexible connection 36 which has several turns thereof received around a pulley 37 fixed upon a shaft 38 which is journaled upon base 1. Springs 39 may be interposed in the flexible connection 36 adjacent the respective ends of the same in order to compensate for shock. By this arrangement it will be seen that the vertical movement of the waves will raise float 9, and subsequently permit the descent of the same by its own weight. This reciprocation of the flexible connection 36 will cause oscillation of pulley 37 and the shaft 38.

A driving connection is provided between shaft 38, and a shaft 39 journaled upon base 1, this driving connection including pulleys 40—41 upon shafts 38—39, and having a chain 42 running over the same. Pulleys 43—44 are mounted upon shaft 39 by pawl and ratchet driving connections such as previously described, so that oscillations of shaft 39 in one direction will provide a driving connection for pulley 43, while the reverse oscillations of a shaft will provide a driving connection for pulley 44. A shaft 45 has pulleys 46—47 fixed thereon in alinement with pulleys 43—44, and a straight belt 48 connects pulleys 43—46, and a crossed belt 49 connects pulleys 44—47. By this arrangement the oppositely rotating driving connections provided by pulleys 43—44 will cause continuous rotation of shaft 45.

The shaft 45 rotates a shaft 50 as by a chain 51 running over a pulley 52 upon shaft 45, and a pulley 53 fixed upon shaft 50. This latter shaft is provided with a gear 54 meshing with a pinion 55 upon a shaft 56, and this pinion is provided with a pawl and ratchet connection with the shaft, such as previously described. Shaft 56 carries a fly-wheel 57, which through the pawl and ratchet connection for pinion 55, is permitted to rotate at a constant speed even though the rotation of pinion 55 varies in speed due to the pauses which will occur between the driving connections provided by the oscillating pulleys 43—44.

Power is taken from shaft 56 for any suitable purpose, and in the present instance the shaft is adapted to rotate an electric generator 58 as by a gear and pinion connection 59—60 between shaft 56 and the shaft 61 of the generator.

It will thus be seen that I have provided a wave motor, wherein both the horizontal and vertical movements of the waves are simultaneously converted into rotary movement of constant speed for actuating any desired mechanism.

Various changes may be made without departing from the spirit of the invention as claimed.

What is claimed is:

1. A wave motor comprising a member actuated by the waves, a shaft rotatably mounted, a radially extending sleeve fixed to said shaft, a rod slidably mounted in said sleeve so as to be reciprocated therein, and connected to said member for imparting oscillating motion to said shaft from the oscillating movement of said member.

2. A wave motor comprising a member actuated by the waves, a shaft rotatably mounted, a radially extending sleeve fixed to said shaft, a rod slidably mounted in said sleeve and connected to said member for imparting oscillating motion to said shaft from the oscillating movement of said member, a second shaft rotatably mounted, and yieldable means carried by said rod for imparting oscillating motion to said second shaft from the reciprocatory movement of said member.

3. A wave motor comprising a member adapted to be actuated by the waves, a rotatably mounted shaft, a radially extending sleeve fixed to said shaft, a rod slidably mounted in said sleeve and connected to said member for imparting oscillatory movement to said shaft when a corresponding movement is imparted to said member, a second shaft mounted for rotary movement, a cable carried by said rod, a pulley fixed to the second shaft and about which said cable is trained whereby upon reciprocating movement of said rod an oscillatory movement of said second shaft is effected.

4. A wave motor comprising a member adapted to be actuated by the waves, a rotatably mounted shaft, a radially extending member fixed to said shaft, a member slidably associated with the second member and connected to the first member for imparting oscillatory movement to said shaft when a corresponding movement is imparted to the first member, a second shaft mounted for rotary movement, a flexible member carried by the third member, and a pulley fixed to the second shaft and about which the flexible member is trained whereby upon reciprocating movement of the third member a rotary movement of the second member is effected.

5. A wave motor comprising a float, a member mounted for reciprocating and oscillatory movements and actuated by said float, means for converting the reciprocating movement of the member into alternate rotary motion, independent means for converting the oscillatory movements of the member into alternate rotary motion, and means for converting the two alternate rotary motions into a continuous rotary motion.

In testimony whereof I have signed my name to this specification.

CLARENCE E. BOONE.